United States Patent
Thelen et al.

(10) Patent No.: US 9,981,743 B2
(45) Date of Patent: May 29, 2018

(54) ELECTRONIC SPEED CONTROLLER ARM FOR VEHICLE

(71) Applicant: QUALCOMM Incorporated, San Diego, CA (US)

(72) Inventors: Christian Oliver Thelen, San Diego, CA (US); Michael Mitrani, San Diego, CA (US); Kevin Truong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 15/099,376

(22) Filed: Apr. 14, 2016

(65) Prior Publication Data

US 2017/0297703 A1 Oct. 19, 2017

(51) Int. Cl.
*B64C 27/00* (2006.01)
*B64C 39/02* (2006.01)
*B64D 31/06* (2006.01)

(52) U.S. Cl.
CPC ............ *B64C 39/024* (2013.01); *B64D 31/06* (2013.01)

(58) Field of Classification Search
CPC ............ B64C 39/024; B64C 2201/027; B64C 2201/108
See application file for complete search history.

(56) References Cited

U.S. PATENT DOCUMENTS

| 9,016,617 | B2 | 4/2015 | Wang et al. | |
|---|---|---|---|---|
| 2002/0106966 | A1* | 8/2002 | Jimenez | A63H 27/00 446/454 |
| 2012/0056041 | A1* | 3/2012 | Rhee | B64C 25/32 244/4 R |
| 2017/0322563 | A1* | 11/2017 | Kohstall | G05D 1/12 |

FOREIGN PATENT DOCUMENTS

| CN | 204297045 U | 4/2015 |
|---|---|---|
| GB | 455374 A | 10/1936 |
| WO | 2014075609 A1 | 5/2014 |
| WO | 2015138217 A1 | 9/2015 |

OTHER PUBLICATIONS

OscarLiang.net, "Where to mount ESC—Quadcopter Arms or body—Multirotor RC," Retrieved dated on Dec. 18, 2015, and Retrieved from the Internet URL: http://blog.oscarliang.net/mounting-esc-arms-body-quadcopter/, 6 pages.
Rought J., et al., "Self-Stabilizing Quad-Rotor Helicopter," 2010, 8 pages.
(Continued)

*Primary Examiner* — Richard G Davis
(74) *Attorney, Agent, or Firm* — Paradice and Li LLP

(57) ABSTRACT

According to various embodiments, an unmanned aerial vehicle (UAV) is provided. The UAV may include a motor controller. The UAV may further include a motor connected to the motor controller. The UAV may further include an arm connected between the motor controller and the motor. The UAV may further include a plurality of electronic speed control components integrated within the arm, the electronic speed control components configured to control the speed of the motor.

21 Claims, 5 Drawing Sheets

(56) References Cited

OTHER PUBLICATIONS

SAM: "Beginners Guide on How to Build a Mini FPV 250 Quadcopter using the Silver Blade," Build Log, DroneTrest, Multirotor, Retrieved dated on Dec. 18, 2015, Retrieved from the Internet URL: http://www.dronetrest.com/t/beginnersguideonhowtobuildaminifpv250quadcopterusingthesilverblade/1253, 12 pages.
International Search Report and Written Opinion—PCT/US2017/018795—ISA/EPO—dated May 30, 2017.

\* cited by examiner

ELECTRONIC SPEED CONTROLLER ARM FOR VEHICLE

BACKGROUND

As unmanned vehicles become increasingly popular for military, commercial, and recreational use, variations of designs of the unmanned vehicles have been developed. As development proceeds, unmanned vehicles having smaller sizes or form factors and that are lighter in weight are contemplated. However, while efforts are made to reduce the size and weight of these unmanned vehicles, the unmanned vehicles may still need to accommodate one or more electronic speed controllers (ESCs) of sufficient size to control one or more respective motors (e.g., the speed of the motors). The ESCs housed in the unmanned vehicles may therefore hinder the compactness and lightness of unmanned vehicle designs.

SUMMARY

In general, various embodiments relate to systems and methods that employ an electronic speed controller (ESC) as part of, or integrated or embedded in the structural body of an unmanned or manned vehicle (such as, but not limited to, an unmanned aerial vehicle (UAV)). In various embodiments, the ESC may form, or be an integral part of an arm of a UAV and also be connected to a motor supported on the arm of the UAV, for controlling the motor.

According to various embodiments, there is provided an unmanned aerial vehicle (UAV) including a motor controller. The UAV may further include a motor connected to the motor controller. The UAV may further include an arm connected between the motor controller and the motor. The UAV may further include a plurality of electronic speed control components forming an integral part of the arm, the electronic speed control components configured to control the speed of the motor.

In some embodiments, the arm is made of at least one circuit board including the electronic speed control components.

In some embodiments, the plurality of electronic speed control components include a heat-producing electrical component.

In some embodiments, the UAV further includes a propeller connected to the motor, wherein the heat-producing electrical component is exposed to and located proximate to the propeller to receive airflow generated by the propeller.

In some embodiments, the heat-producing electrical component is a field effect transistor.

In some embodiments, the plurality of electronic speed control components are printed on the arm.

In some embodiments, the arm includes an input port configured to connect to the motor controller.

In some embodiments, the arm includes an output port configured to connect to the motor.

According to various embodiments, a method for manufacturing an unmanned aerial vehicle (UAV) is provided. The method may include providing a motor controller. The method may further include connecting an arm between the motor controller and a motor. The method may further include electrically connecting the motor controller to the motor through a plurality of electronic speed control components integrated in the arm, the electronic speed control components configured to control the speed of the motor.

In some embodiments, the electrically connecting includes supplying an arm made of at least one circuit board including the electronic speed control components.

In some embodiments, the electrically connecting includes connecting a heat-producing electrical component.

In some embodiments, the method further includes connecting a propeller to the motor, wherein the heat-producing electrical component is exposed to and located proximate to the propeller to receive airflow generated by the propeller.

In some embodiments, the connecting the heat-producing electrical component includes supplying a field effect transistor.

In some embodiments, the electrically connecting comprises printing the plurality of electronic speed control components on the arm.

In some embodiments, the method further includes providing an input port in the arm, the input port configured to connect to the motor controller.

In some embodiments, the method further includes providing an output port in the arm, the output port configured to connect to the motor.

According to various embodiments, there is provided an apparatus for manufacturing an unmanned aerial vehicle (UAV). The apparatus may include means for controlling a motor. The apparatus may further include means for connecting the means for controlling the motor and the motor. The apparatus may further include means for controlling the speed of the motor integrated into the means for connecting the means for controlling the motor and the motor, the means for controlling the speed of the motor electrically connected to the means for controlling the motor and the motor.

In some embodiments, the means for connecting the means for controlling the motor and the motor comprises at least one circuit board means for providing the means for controlling the speed of the motor In some embodiments, the means for controlling the speed of the motor comprises a heat-producing electrical component.

In some embodiments, the apparatus further includes means for providing propulsion connected to the motor, wherein the heat-producing electrical component is exposed to and located to receive an airflow generated by the means for providing propulsion.

DETAILED DESCRIPTION

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

Embodiments described herein can provide various benefits, including configurations that allow for reductions in size, form factor, and/or weight of a UAV (or other unmanned vehicle). Some embodiments described herein may provide a UAV with additional or improved performance capabilities and uses, such as, but not limited to, more nimble flight, longer flight times, etc.

Figure 1:
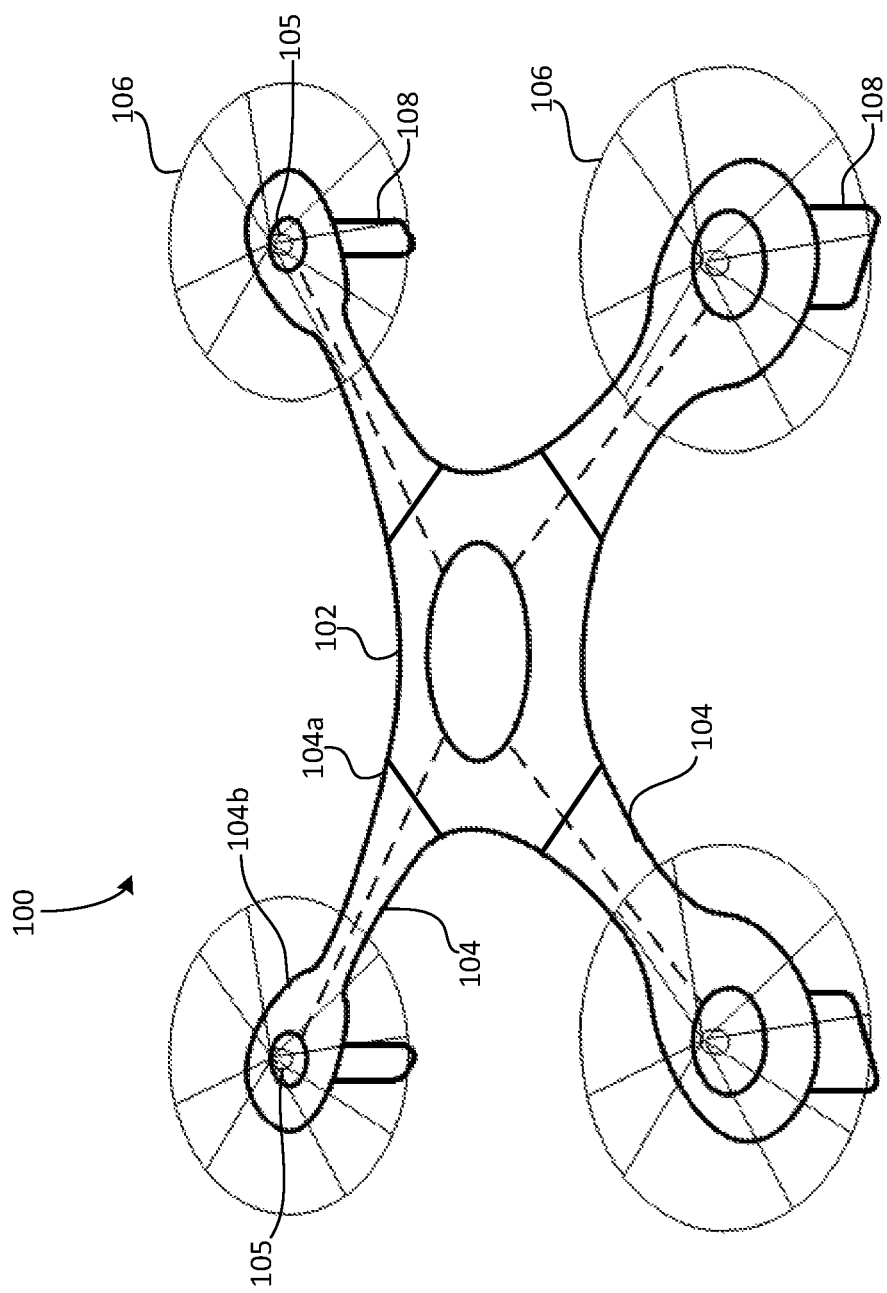
FIG. 1 illustrates a perspective view of an example of an unmanned aerial vehicle according to various embodiments.

FIG. 1 illustrates a perspective view of an example of an unmanned aerial vehicle 100 according to various embodiments. Referring to FIG. 1, the UAV 100 includes a main body 102. The UAV 100 further includes a plurality of extended portions or arms 104 that extend from the main body 102. Each of the arms 104 has a first end 104a that is attached to (or integrated with) the main body 102. Although some embodiments include four arms 104 extending from the main body 102, in other embodiments, UAVs may include any suitable number of arms. For example, further embodiments may include or employ a UAV having one arm, two arms, three arms, or more than four arms. Other embodiments may include or employ a UAV having no arms, for example, that is configured as a helicopter-style UAV or a UAV having a propeller at its main body 102.

In some embodiments, the UAV 100 includes a propeller 106 at a second end 104b of each arm 104, opposite the first arm end 104a. The propellers 106 are configured to provide aerial propulsion to the UAV 100 such that the UAV 100 is capable of flight and maneuvering during flight. In some embodiments, the propellers 106 are located on top of the arms 104 at the second ends 104b of the arms 104. In addition, the UAV 100 may have a plurality of legs 108 or other landing platform(s). In some embodiments, there may be a leg 108 at the bottom of each arm 104. The legs 108 support the UAV 100 in an upright or standing orientation, when the UAV 100 is on the ground and not in flight. In other embodiments, the propellers 106 may be provided at other suitable locations, such as, but not limited to, the end surface or the bottom of each of the arms 104. Each propeller 106 may be coupled to a respective motor 105. Each motor 105 may include a rotor. The motors 105 are configured to drive and spin the propellers 106 at speeds sufficient to achieve aerial propulsion of the UAV 100.

The UAV 100 may include one or more electronic speed controller (ESC) for providing electrical signals to control one or more of the motors 105. In particular embodiments, each motor is connected with an associated ESC by wires or other suitable electrical conductors for providing electronic control signals to the motor. An ESC may be configured to control the speed and direction of a motor connected to the ESC. However, including separate ESCs and excess wiring connecting the ESCs within the UAV 100 adds extra weight to the UAV 100. As such, embodiments provide a UAV in which the (or each) ESC forms an integral part of one or more (or each) of the arms 104 (forming an ESC arm 104) of the UAV 100. That is, the ESC(s) may serve as the arm(s). Accordingly, the UAV 100 need not include a separate ESC housed within the UAV 100, resulting in a lighter-weight UAV configuration. In particular embodiments, the ESC electrical components form an inseparable part of one or more of the arms 104.

The main body 102 and the arms 104 of the UAV 100 may be made of any suitable materials, including, but not limited to plastic, metal, wood, ceramic, composite material, or combinations thereof. In particular embodiments, at least a portion of (or the entire) structure of one or more (or each) arm 104 is composed of a circuit board material or substrate, on which electronic speed control electrical circuit components are formed or mounted. For example, the arms 104 may be made from printed circuit board, on which the electronic speed control components are printed. In further embodiments, at least a portion of the main body 102 is composed of a circuit board material or substrate, that forms one or more (or all) ESCs.

Although the UAV 100 may include propellers 106 in some embodiments, other embodiments employ other suitable aerial propulsion systems including, but not limited to, a ducted fan system, a jet engine system, and/or the like. Although some embodiments of the UAV 100 have a multi-arm configuration, other embodiments may include or operate with other UAV configurations, such as, but not limited to, helicopter-style UAVs, airplane-style UAVs (e.g., fixed-winged UAVs), zeppelin or blimp-style UAVs, and/or other multicopter-style UAVs. Also, while some embodiments are described herein with reference to UAVs, other embodiments may include or employ other types of aerial vehicles, including manned vehicles. In addition, some embodiments of unmanned vehicles may be capable of travel by land and/or water instead of, or in addition to, aerial travel.

Figure 2:
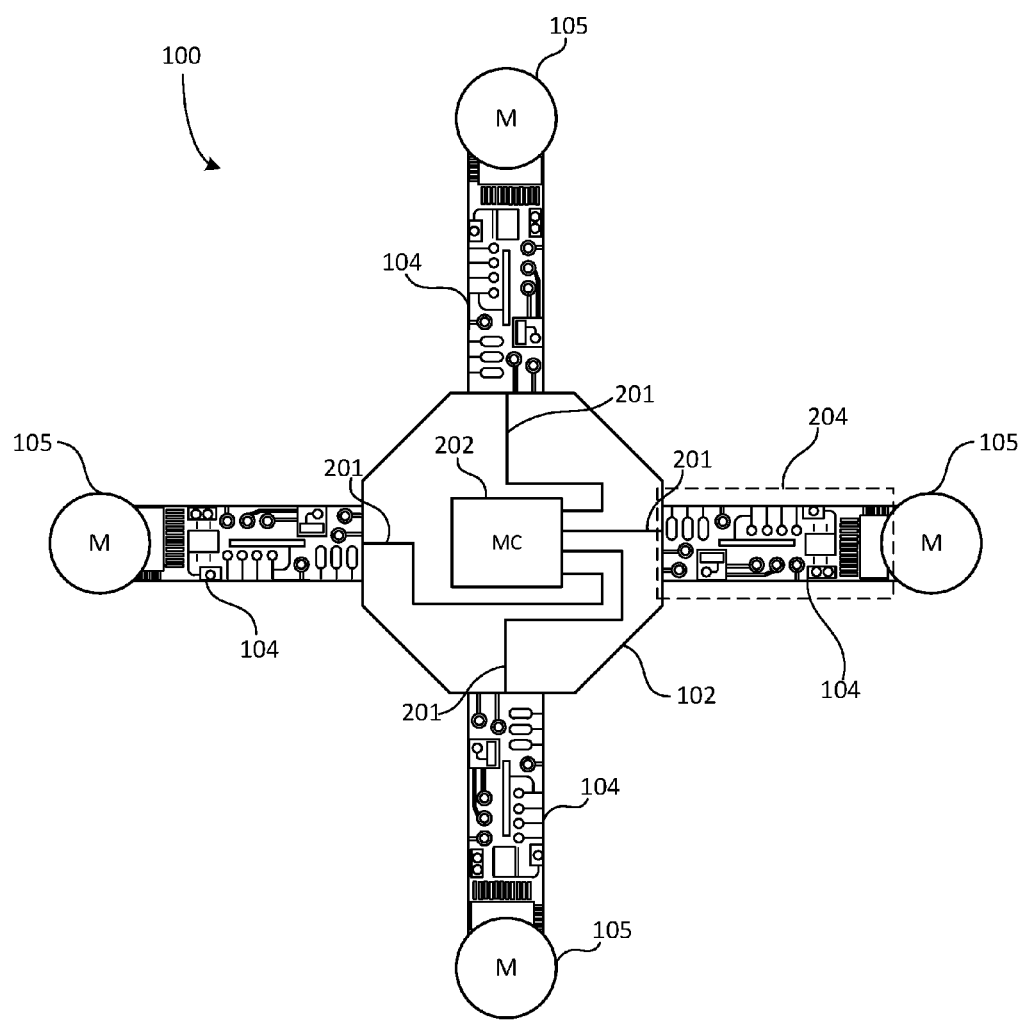
FIG. 2 illustrates a top view of an example of an unmanned aerial vehicle including an electronic speed controller arm according to various embodiments.

FIG. 2 illustrates a top view of the UAV 100. With reference to FIGS. 1-2, the UAV 100 may include a motor controller (MC) 202 located at the main body 102 of the UAV 100. The one or more arms 104 may be formed of and include a plurality of electronic speed control electrical components 204 for providing the functions of an ESC. The MC 202 may be a component or module of the UAV 100 that is pre-installed in the UAV 100 by an original manufacturer or a user. In some embodiments, the MC 202 is located in the main body 102, while in other embodiments, the MC 202 may be located at any other suitable location on the UAV 100, such as, but not limited to, the arm 104 or the motor 105.

The MC 202 may be configured to transmit motor control signals to each of the ESC arms 104 via the respective one or more electrical conductors 201, such as, but not limited to, electrical wiring, traces, and/or the like. In some embodiments, the UAV 100 may include four separate one or more electrical conductors 201 corresponding to four different ESC arms 104. In other embodiments, the UAV 100 may include any suitable number of one or more electrical conductors 201 according to the number of ESC arms 104 at the UAV 100, such as, but not limited to, two of the one or more electrical conductors 201 for a UAV including two ESC arms 104, five of the one or more electrical conductors 201 for a UAV including five ESC arms, and so on.

As such, the MC 202 may control various flight characteristics of the UAV 100, such as, but not limited to, speed, trajectory, rotation, altitude, and attitude of the UAV 100 in controlling each of the motors 105 (e.g., via respective connected ESC arms), which, in turn, controls respective propellers 106. For example, in some embodiments, the ESC arms 104 may control (based on the motor control signals received from the MC 202) a speed at which each individual propeller 106 rotates for achieving a desired velocity, direction, or altitude of the UAV 100 during flight by controlling a respective motor 105 associated with each of the individual propellers 106. In further embodiments, the UAV 100 may include propellers 106 that are capable of physically and mechanically tilting at various angles with respect to the arms 104 to provide even finer control of the UAV 100 during flight.

In some embodiments, the UAV 100 may be controlled remotely by a user using a user device, such as, but not limited to, a tablet, a mobile phone, a laptop, etc. The user, via the user device, may input flight commands to be implemented by the UAV 100. In particular embodiments, the user commands may be received by the MC 202, and, in turn, the MC 202 may transmit corresponding motor control signals to the ESC arms 104 coupled to the motors 105 in carrying out the received user commands. In other embodiments, a defined flight path may be pre-programmed into the MC 202, which may direct the flight of the UAV 100 during a flight session.

In some embodiments, the electronic speed control components 204 that form at least a portion of each or the ESC arms 104 include, but are not limited to, one or more of transistors (e.g., field effect transistors), capacitors, resistors, operational amplifiers, diodes, a processor, a memory, or the like. The electronic speed control components 204 may be integrated or embedded in an ESC structure that forms a sufficiently rigid arm (ESC arm 104) for supporting a motor 105. In some embodiments, the electronic speed control components 204 are printed on a circuit board, and the circuit board with the electronic speed control components 204 form a rigid arm structure or a portion of a rigid arm structure of the ESC arm 104. In particular embodiments, each of the ESC arms 104 provides a rigid arm structure for supporting a motor 105 and also provides electronic speed control signals to the motor 105 supported by the rigid arm, such that the UAV 100 need not include a separate, dedicated ESC supported in or on the UAV 100. In some embodiments, the electronic speed control components 204 is inseparable from the ESC arm 104.

In some embodiments, printing includes electrically connecting electronic components using conductive traces, pads, or other features on a circuit board. The printing may further include etching from copper sheets that are laminated onto a non-conductive substrate. The electronic components on the board may be connected with plated-through holes (e.g., vias in the printed circuit board). In some embodiments, the manufacturing of a printed circuit board may include, but not be limited to, such processes as, panelization, copper patterning (e.g., silk screen printing, photoengraving, PCB milling, or the like), chemical etching, lamination, plating and coating, legend printing, or the like.

During operation of the UAV 100, one or more of the electrical components in the arm 104 may produce heat (referred to as heat-producing electrical components). In some embodiments, the heat-producing electrical components include, but are not limited to, the field effect transistors of the electronic speed control components. Accordingly, in various embodiments, the heat-producing electrical components of the electronic speed control components 204 may be positioned proximate the propellers 106 such that the air generated by the propellers 106 during operation of the UAV 100 is received by the heat-producing electrical components integrated or embedded in the arm 104, and dissipates the heat produced by those electrical components. In some embodiments, the heat-producing components are positioned directly below the propellers 106 at the arms 104 to increase airflow received from the propellers 106. In particular embodiments, the heat-producing electrical components are located at the top surface of the ESC arm 104 so that the heat-producing electrical components are exposed to the airflow generated by the propeller 106.

In some embodiments, the ESC arm 104 includes only the electronic speed control components 204 (and not a printed circuit board upon which the electronic speed control components 204 are printed). In other words, the electronic speed control components 204 themselves may form the ESC arm 104. In some embodiments, the electronic speed control components 204 are attached to each other by any suitable means, such as, but not limited to, soldering, welding, adhesive, or the like. In some embodiments, the electronic speed control components 204 are attached to each other and to the rest of the UAV 100 to form the ESC arm 104 such that the ESC arm 104 is rigid enough for flight. In some embodiments, the rigidity of a printed board-less ESC arm 104 is rigid enough to support the motor 105. In some embodiments, the electronic speed control components 204 may be coated with a substance to increase rigidity and strength of the ESC arm 104, such as, but not limited to, acrylic, epoxy, polyurethane, or the like.

In some embodiments, the arms 104 including the electronic speed control components 204 also include an input port and an output port. The input port may connect to the main body 102, and the output port may connect to the motor 105. As such, the arm 104 itself can receive motor control signals from the motor controller 202 in the main body 102 via the input port of the arm 104, can process the motor control signals, and transmit corresponding electronic speed control signals to the motor 105 via the output port of the arm 104. Further description pertaining to the components of the ESC arm 104 is disclosed for example with respect to FIG. 3.

Figure 3:
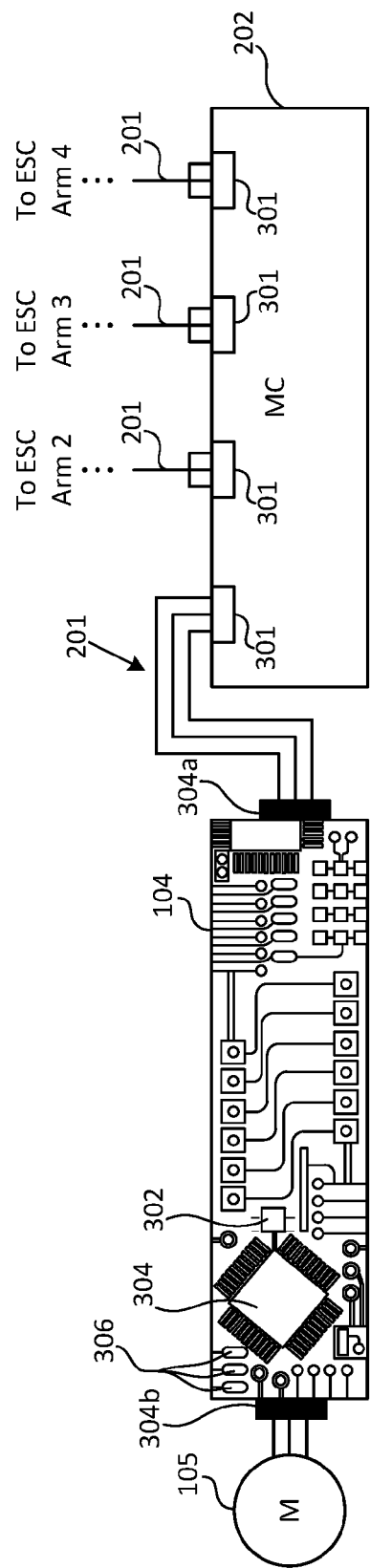
FIG. 3 illustrates a schematic view of an example of a wiring configuration of an unmanned aerial vehicle including an electronic speed controller arm according to various embodiments.

FIG. 3 illustrates a schematic view of a wiring configuration of the unmanned aerial vehicle 100 including the ESC arm 104 according to various embodiments. Referring to FIGS. 1-3, in various embodiments, the MC 202 may include output ports 301 coupled to the ESC arms 104. In some embodiments, the MC 202 may include four separate output ports 301 corresponding to the four different ESC arms 104 and motors 105. In other embodiments, the MC 202 may include any suitable number of output ports 301 according to the number of motors 105 at the UAV 100, such as, but not limited to, two output ports 301 for a UAV including two motors, five output ports 301 for a UAV including five motors, and so on.

In some embodiments, the ESC arm 104 may include an input port 304*a* connected to the MC 202 and an output port 304*b* connected to the motor 105. The UAV 100 may include an individual ESC arm 104 coupled between each motor 105 and the MC 202, resulting in a first ESC arm 104 coupled to one of the motors 105 (a first motor) and three additional ESC arms (ESC arm 2, ESC arm 3, ESC arm 4) coupled to respective ones of the remaining three motors 105. In some embodiments, the ESC arm 104 includes a memory 302, a processor 304, one or more heat-producing electrical components 306, and other electrical components for achieving electronic speed control of the motor 105 (e.g., resistors, capacitors, or the like).

In some embodiments, the memory 302 and the processor 304 may operate with each other to store and run software related to controlling the operation of the ESC arm 104. For example, the processor 304 may process software and/or data stored on the memory 302, where such software may control the processor 304 and other components of the ESC arm 104 to perform functions of the ESC arm 104.

According to some embodiments, the memory 302 may be a non-transitory processor-readable storage medium that stores processor-executable instructions. The memory 302 may include any suitable internal or external device for storing software and data. Examples of the memory 302 may include, but are not limited to, random access memory (RAM), read only memory (ROM), floppy disks, hard disks, dongles, or other recomp sensor board (RSB) connected memory devices, or the like. The memory 302 may store an operating system (OS), user application software, and/or executable instructions. The memory 302 may also store application data, such as, but not limited to, an array data structure.

According to some embodiments, the processor 304 may be a general-purpose processor. The general-purpose processor 304 may include any suitable data processing device, such as, but not limited to, a microprocessor. In the alternative, the general-purpose processor 304 may be any suitable electronic processor, controller, microcontroller, or state machine. The general-purpose processor 304 may also be implemented as a combination of computing devices (e.g., a combination of a digital signal processor (DSP) and a microprocessor, a plurality of microprocessors, at least one microprocessor in conjunction with a DSP core, or any other suitable configuration).

In some embodiments, the ESC arm 104 receives motor control signals generated from the MC 202 via the input port 304a. The input port 304a may be connected to the electrical conductor 201 that transmits the motor control signals from the MC 202. The motor control signals may include instructions related to control of the motor 105 (e.g., speed and direction of rotation of the motor 105 to achieve desired flight). In some embodiments, the processor 304 of the ESC arm 104 may receive the motor control signals for processing of the signals. For example, the processor 304 may read and interpret the motor control signals and generate ESC signals to the motor 105 based on the instructions of the received motor control signals. For example, the motor control signals from the MC 202 may contain instructions to increase the speed of the motor 105 (e.g., if the UAV 100 is accelerating). As such, the ESC arm 104 may control the motor 105 to increase its rotational speed consistent with the motor control signals received by the processor 304.

In some embodiments, the ESC arm 104 may include a plurality of heat-producing electrical components 306. For example, the heat-producing components 306 may include, but not be limited to, field effect transistors or the like. In some embodiments, the heat-producing electrical components 306 may be positioned proximate the motor 105. Accordingly, the airflow generated by a propeller 106 connected to the motor 105 may produce a cooling effect on the heat-producing electrical components 306. In other embodiments, the length of the ESC arm 104 is covered by a barrier, such as, but not limited to, a plastic sleeve, a mesh screen (e.g., so that the heat-producing components 306 may still receive airflow), a rigid cover, a solidified resin or other coating, or the like, such that the electronic speed control components 204 are protected from direct contact with foreign objects or exposure to other environmental conditions. In some embodiments, a portion of the ESC arm 104 is covered, while a portion of the ESC arm 104 is uncovered (e.g., the portion of the ESC arm 104 having the heat-producing components 306 may be uncovered for receiving the airflow from the propellers).

In some embodiments, the processor 304 may generate ESC signals, which correspond to the motor control signals received from the MC 202, for controlling the motor 105. The processor 304 may transmit the ESC signals to the output port 304b of the ESC arm 104. In some embodiments, the output port 304b is directly connected to the motor 105, such that the motor 105 itself is supported by the ESC arm 104 (e.g., the motor 105 may plug into the output port of the ESC arm 104). In other embodiments, conductive traces may be connected between the output port 304b and the motor 105 for transmitting the ESC signals from the ESC arm 104 to the motor 105.

According to various embodiments, the input port 304a and the output port 304b of the ESC arm 104 may be configured to have connections or hardware compatible with the MC 202 and the motor 105, and the output ports 301 of the MC 202 may be configured to have connections or hardware compatible with the ESC arm 104. In other words, in various embodiments, the ESC arm 104 may be configured (e.g., have hardware configured) to use the same predetermined data protocol as that of the MC 202 and the motor 105. In some embodiments, the predetermined data protocol may be pulse-width modulation (PWM) that uses a 3-wire connection (e.g., at the one or more electrical conductors 201). Accordingly, in such embodiments, the input port 304a and the output port 304b of the ESC arm 104 may be configured for PWM, and include connection locations configured to be compatible with 3-wire conductors.

According to other embodiments, other data protocols may be used in the UAV 100 including, but not limited to, Universal Asynchronous Receiver Transmitter (UART) and Inter-Integrated Circuit (I2C). UART is a serial data protocol (e.g., data is sent spread over time, for example, one single bit after another). UART uses a single data line for transmitting and another data line for receiving data. As such, in UART system embodiments, one or more electrical conductors 201 may include two separate electrical wires, as opposed to the three wires associated with PWM. In embodiments having a UART environment, communicating hardware may agree on the transmission speed or bit rate, as this data protocol is asynchronous. Other embodiments may utilize Universal Synchronous/Asynchronous Receiver Transmitter (USART), which is similar to UART, but also utilizes a clock for synchronization. Accordingly, in embodiments using USART data protocols, three separate electrical wires (e.g., at the one or more electrical conductors 201) may be used: two for transmitting and receiving data and a third for the clock. In other embodiments, the UAV 100 may utilize other serial data protocols, such as, but not limited to, serial data protocols that use four wires. In other embodiments, I2C, which is also a synchronous protocol similar to USART, may be utilized. In such I2C embodiments, two wires (e.g., at the one or more electrical conductors 201) may be used: one for a clock and one for data. Accordingly, the connection locations at the input port 304a and the output port 304b of the ESC arm 104 may be manufactured to be compatible with various data protocols using any suitable number of conductors.

In some embodiments, the ESC arm 104 may be removably attached to the main body 102 (e.g., at the input port 304a of the ESC arm 104 and the output port 301 of the MC 202) and the motor 105 (at the output port 304b). As such, in some embodiments, the ESC arm 104 can be easily replaced with another ESC arm, for example, if the original arm is damaged or malfunctions. In some embodiments, the ESC arm 104 may detect the data protocol (e.g., UART or I2C) used by the motor controller 202, and thus the ESC arm 104 can configure itself to be compatible with the data protocol used by the UAV 100. For example, the processor 304 can detect the data protocol used by the motor controller 202 of the UAV 100, and can execute software corresponding to the detected data protocol. Accordingly, the input port 304a and/or the output port 304b may include plug configurations that are physically configured to receive and transmit signals based on different data protocols. As such, the ESC arm 104 can be a modular and independent component of the UAV 100 that can be removed by simply unplugging the ESC arm 104 from the UAV 100, and can be replaced with another pluggable ESC arm 104.

In some embodiments, the plugs of the input port 304*a* and 304*b* may be configured to be compatible with specific types of UAVs (e.g., those that use I2C data protocol), and so may be configured to be plugged into only those specific UAV types (and configured to not plug into other UAV types). In some embodiments, the modular ESC arms 104 can be keyed to certain motor locations of the UAV 100. For example, an ESC arm 104 can be configured to be plugged into only the motor that is designated to be the front of the UAV, or a motor designated to be the rear-left motor, etc. In some embodiments, the ESC arm 104 can be specialized based on usage of the ESC arm 104. For example, an ESC arm 104 can be designed for racing, another ESC arm 104 can be designated for package delivery, and the like. As an example, the racing ESC arm 104 can be provided with a protective cover over the exposed electronic speed control components, as a racing UAV may be prone to collisions. As another example, a delivery ESC arm may be designed to have the components at a top surface of the arm, as a carried package may contact the underside of the ESC arm so as to damage the electronic speed control components.

In some embodiments, the ESC arm 104 can be sprayed or coated with a non-conductive coating for further protection of the electronic speed control components 204. The non-conductive coating can be any substance that provides non-conducting characteristics, such as, but not limited to, resin, silicon, wax, or the like. Although not shown, similar connection configurations as those shown with respect to ESC arm 104 may be implemented in connection with ESC arm 2, ESC arm 3, and ESC arm 4.

Figure 4A:
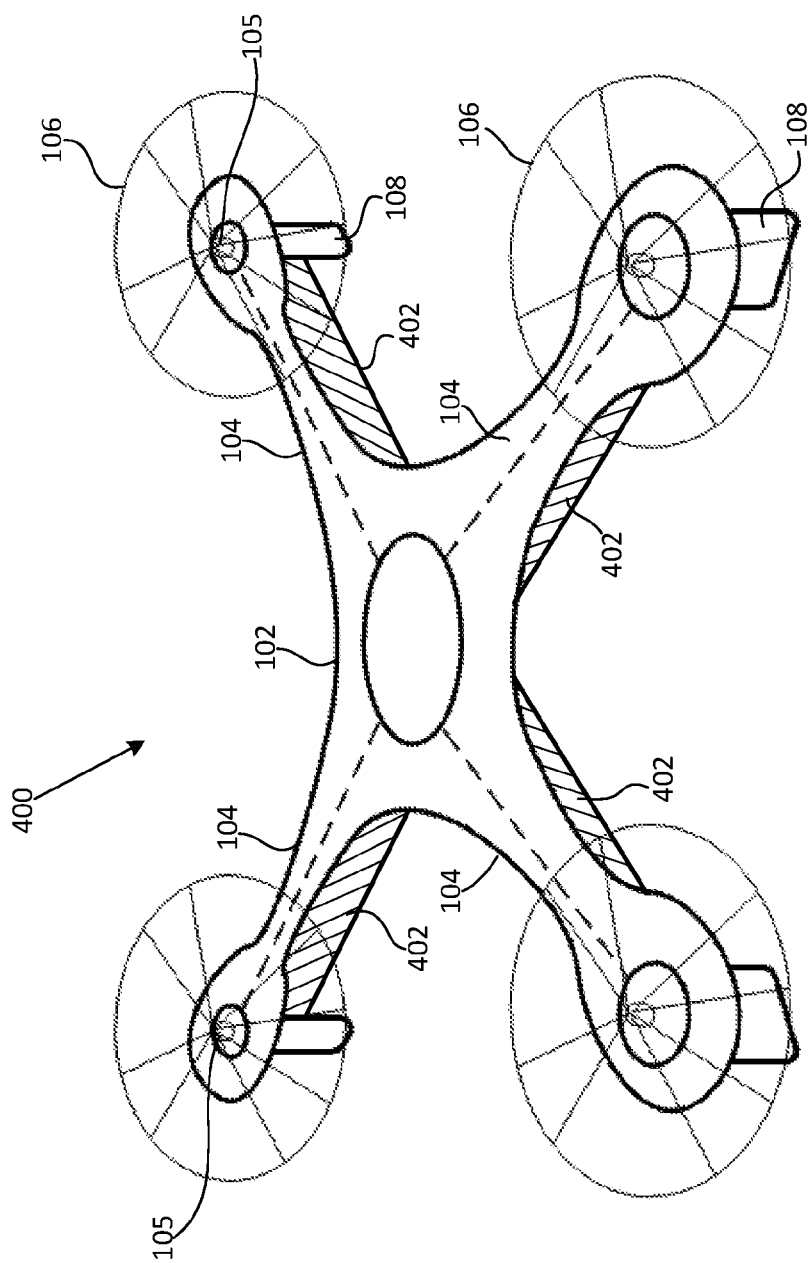
FIGS. 4A and 4B illustrate perspective views of examples of unmanned aerial vehicles according to various embodiments.
Figure 4B:
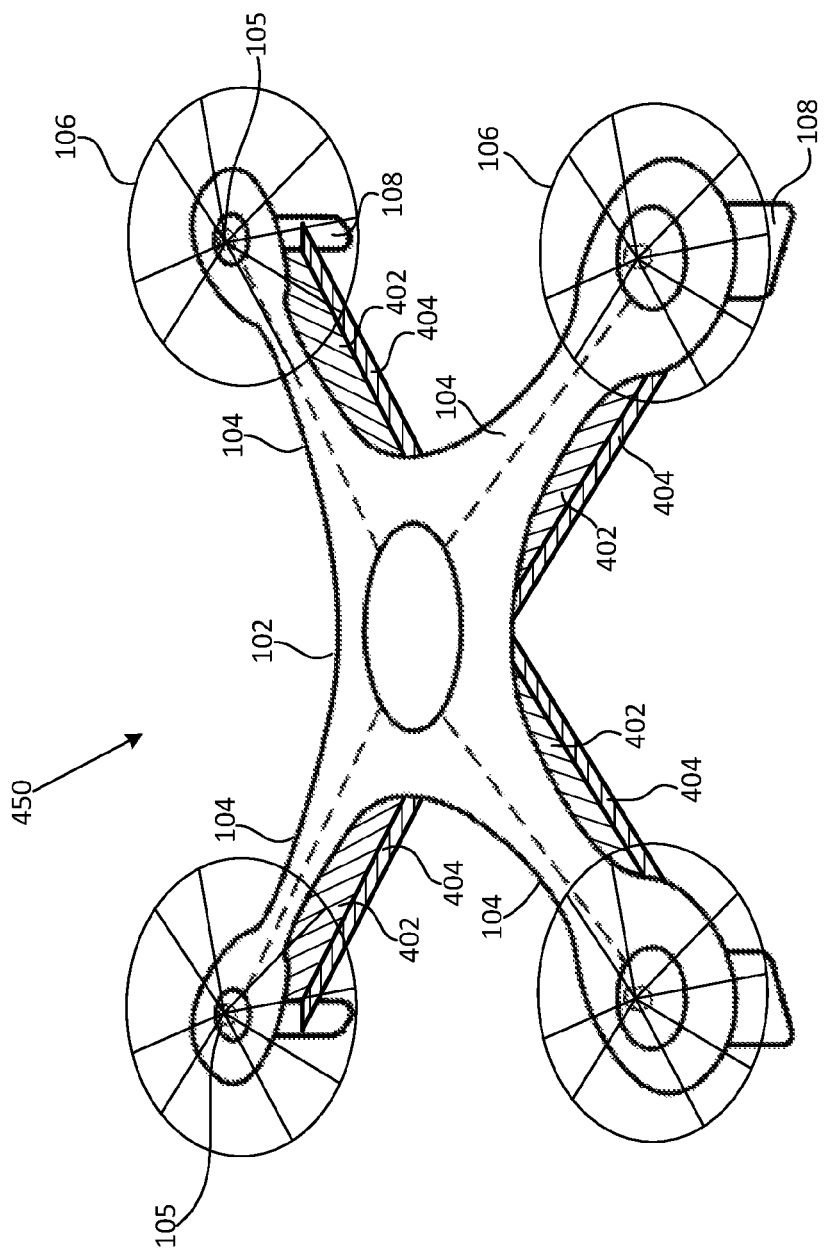

FIGS. 4A and 4B illustrate perspective views of unmanned aerial vehicles according to various embodiments. Referring to FIGS. 1-4A, a UAV 400 may correspond to UAV 100, and may further include a perpendicular arm 402 coupled to the arm 104 such that the perpendicular arm 402 and the arm 104 are oriented perpendicular to each other. The perpendicular arm 402 may be an extension of the arm 104 or may be a separate attached component to the arm 104. In some embodiments, the perpendicular arm 402 may be attached to the arm 104 in any suitable manner, such as, but not limited to, welding, adhesive, fastening, or the like.

In some embodiments, the perpendicular arm 402 is removably attached to the arm 104 such that the perpendicular arm 402 can easily be removed from and reattached to the UAV 400. For example, the arm 104 may include a plurality of receptacles for receiving corresponding protrusions at the perpendicular arm 402 for engagement and fastening between the arm 104 and the perpendicular arm 402 (e.g., plug and play). As such, the structure of the arm 104 and the attached perpendicular arm 402 may provide a "T-beam" structure to the overall arm between the main body 102 and the motor 105. This arm structure may increase the stability, structural strength, and rigidity of the UAV 400 during flight.

In some embodiments, the perpendicular arm 402 may be made of any suitable materials, including, but not limited to, plastic, metal, wood, ceramic, composite material, or combinations thereof. In some embodiments, the perpendicular arm 402 may be made of the same or different material than that of the arm 104. In particular embodiments, at least a portion of (or the entire) structure of one or more (or each) perpendicular arm 402 is composed of a circuit board material or substrate, on which the electronic speed control electrical circuit components are formed. For example, the perpendicular arms 402 may be made from printed circuit board, on which the electronic speed control components are printed. In some embodiments, the arm 104 may include a portion of the electronic speed control electrical circuit components, and the perpendicular arm 402 may include the remainder of the electronic speed control electrical circuit components, and the components of the arm 104 and the perpendicular arm 402 may be electrically connected for controlling the motor 105.

Referring to FIG. 1-4B, a UAV 450 may correspond to UAV 100, 400, and may further include a parallel arm 404 coupled to the perpendicular arm 402 such that the parallel arm 404 and the arm 104 are oriented parallel to each other, and the parallel arm 404 and the perpendicular arm 402 are oriented perpendicular to each other. The parallel arm 404 may be an extension of the arm 104 and the perpendicular arm 402, or may be a separate attached component to the perpendicular arm 402. In some embodiments, the parallel arm 404 may be attached to the perpendicular arm 402 in any suitable manner, such as, but not limited to, welding, adhesive, fastening, or the like. In some embodiments, the parallel arm 404 is removably attached to the perpendicular arm 402 such that the parallel arm 404 can easily be removed from and reattached to the UAV 400 (e.g., the perpendicular arm 402). As such, the structure of the arm 104, the attached perpendicular arm 402, and the attached parallel arm 404 may provide an "I-beam" structure to the overall arm structure between the main body 102 and the motor 105. This arm structure may increase the stability, structural strength, and rigidity of the UAV 400 during flight.

In some embodiments, the parallel arm 404 may be made of any suitable materials, including, but not limited to, plastic, metal, wood, ceramic, composite material, or combinations thereof. In some embodiments, the parallel arm 404 may be made of the same or different material than that of the arm 104 and the perpendicular arm 402. In particular embodiments, at least a portion of (or the entire) structure of one or more (or each) perpendicular arm 402 is composed of a circuit board material or substrate, on which the electronic speed control electrical circuit components are formed. For example, the parallel arms 404 may be made from printed circuit board, on which the electronic speed control components are printed. In some embodiments, the arm 104 may include a portion of the electronic speed control electrical circuit components, the perpendicular arm 402 may include another portion of the electronic speed control electrical circuit components, and the parallel arm 404 may include the remainder of the electronic speed control electrical circuit components. In some embodiments, the components of the arm 104, the perpendicular arm 402, and/or the parallel arm 404 may be electrically connected for controlling the motor 105.

In some embodiments, each of the arm 104, the perpendicular arm 402, and the parallel arm 404 are flat rectangular structures having a length dimension substantially longer than a width dimension. In particular embodiments, the perpendicular arm 402 is oriented vertically along its width and attached to the arm 104 along its length at a lengthwise edge of the perpendicular arm 402, and the parallel arm 404 is oriented horizontally along its width and attached to the perpendicular arm 402 along its length at a flat surface (e.g., face) of the parallel arm 404. In some embodiments, the perpendicular arm 402 is attached to the arm 104 along a midpoint of the width of the arm 104. Similarly, the parallel arm 404 may be attached to the perpendicular arm 402 along a midpoint of the width of the parallel arm 404.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The above used terms, including "attached," "connected," "fastened," "secured," "coupled," "integrated," and the like are used interchangeably. In addition, while certain embodiments have been described to include a first element as being "coupled" (or "attached," "connected," "fastened," etc.) to a second element, the first element may be directly coupled to the second element or may be indirectly coupled to the second element via a third element.

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, such as, but not limited to, a combination of a DSP and a microprocessor, a plurality of microprocessors, one or more microprocessors in conjunction with a DSP core, or any other such configuration. Alternatively, some steps or methods may be performed by circuitry that is specific to a given function.

In some example embodiments, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

What is claimed is:
1. An unmanned aerial vehicle (UAV) comprising:
 a body comprising a motor controller configured to control flight characteristics of the unmanned aerial vehicle;
 an arm connected between the body and a motor, the arm including at least one input port electrically coupled to the motor controller, and including at least one output port electrically coupled to the motor; and at least one electronic speed control component electrically coupled to the at least one input port and configured to control the motor.

2. The UAV of claim 1, wherein the arm is made of at least one circuit board comprising at least one conductive trace.

3. The UAV of claim 2, wherein the at least one conductive trace is electrically connected to the at least one electronic speed control component.

4. The UAV of claim 1, wherein the at least one electronic speed control component comprises a heat-producing electrical component.

5. The UAV claim 4, further comprising a propeller connected to the motor, wherein the heat-producing electrical component is exposed to the propeller to receive airflow generated by the propeller.

6. The UAV of claim 4, wherein the heat-producing electrical component is a field effect transistor.

7. The UAV of claim 1, wherein the at least one electronic speed control component is electrically coupled to at least one conductive trace printed on the arm.

8. The UAV of claim 1, wherein the arm is removably attached to the body.

9. The UAV of claim 1, wherein the arm is removably attached to the motor.

10. The UAV of claim 1, wherein the input port is coupled to the motor.

11. The UAV of claim 1, wherein the input port is configured to receive motor control signals from the motor controller.

12. The UAV of claim 11, wherein the motor controller transmits electronic speed control signals to the motor through the output port of the arm.

13. The UAV of claim 1, wherein the input port is configured to perform a predetermined data protocol.

14. The UAV of claim 13, wherein the predetermined data protocol is a data protocol of the motor controller.

15. The UAV of claim 13, wherein the predetermined data protocol is a pulse-width modulation protocol.

16. The UAV of claim 13, wherein the input port comprises a plug configuration that is physically configured to receive signals of the predetermined data protocol.

17. A method for manufacturing an unmanned aerial vehicle (UAV), comprising:
   providing a body comprising a motor controller configured to control flight characteristics of the unmanned aerial vehicle;
   providing an arm connected between the body and a motor, the arm including at least one input port electrically coupled to the motor controller, and including at least one output port electrically coupled to the motor; and
   providing at least one electronic speed control component electrically coupled to the at least one input port and configured to control the motor.

18. The method of claim 17, wherein the arm is made of at least one circuit board comprising at least one conductive trace.

19. The method of claim 18, wherein the at least one conductive trace is electrically connected to the at least one electronic speed control component.

20. The method of claim 17, wherein the input port is coupled to the motor.

21. The method of claim 17, wherein the input port is configured to receive motor control signals from the motor controller.

* * * * *